United States Patent [19]

Bernstein

[11] Patent Number: 4,980,886
[45] Date of Patent: Dec. 25, 1990

[54] COMMUNICATION SYSTEM UTILIZING DYNAMICALLY SLOTTED INFORMATION

[75] Inventor: Simon Bernstein, Reston, Va.

[73] Assignee: Sprint International Communications Corporation, Reston, Va.

[21] Appl. No.: 266,805

[22] Filed: Nov. 3, 1988

[51] Int. Cl.⁵ .............................................. H04J 3/17
[52] U.S. Cl. .................................... 370/80; 370/85.7; 370/95.3
[58] Field of Search ............... 370/84, 95, 118, 110.1, 370/79, 80, 85.6, 85.7, 95.1, 95.3, 81

[56] References Cited

U.S. PATENT DOCUMENTS

| | | | |
|---|---|---|---|
| 4,504,946 | 3/1985 | Raychaundhuri | 370/95.3 |
| 4,593,282 | 6/1986 | Acampora et al. | 370/85.6 |
| 4,731,783 | 3/1988 | Fontanes | 370/84 |
| 4,763,319 | 8/1988 | Rozenblit | 370/84 |
| 4,763,325 | 8/1988 | Wolfe et al. | 370/95 |
| 4,852,089 | 7/1989 | Berry et al. | 370/95.1 |

Primary Examiner—Douglas W. Olms
Assistant Examiner—Melvin Marcelo
Attorney, Agent, or Firm—Leitner, Greene & Christensen

[57] ABSTRACT

Burst switching apparatus for a hybrid switching and transmission system adapted to carry multimedia traffic components including voice and data in multi-slotted frames, in which components of the traffic to be transmitted from the sources thereof are assigned to respective selected slots in each frame to assure transmission of information generated by each active source within a predetermined bandwidth, and the bandwidth is reallocated as necessary to provide additional slots within each frame to the active sources on a frame-by-frame basis to accommodate the respective bandwidths required for the information generated by those sources from among the total available bandwidth of the system. The reallocation to provide additional slots is achieved by a combination of external control of bandwidth and dynamic allocation of bandwidth, by which the additional slots that are temporarily assigned to any active source are obtained from among those slots to which other sources have priority, on a frame-by-frame basis for only so long as the sources having priority to the temporarily assigned slots are inactive.

34 Claims, 10 Drawing Sheets

| STATE NUMBER | BSP | EXPLANATION ||
|---|---|---|---|
| | | VOICE SLOT | DATA SLOT |
| 1 | X 0 X 0 | IDLE/SILENCE | IDLE/SILENCE |
| 2 | 1 1 1 1 | TC1 | IDLE/SILENCE |
| 3 | X 0 0 1 | IDLE/SILENCE | TC2 |
| 4 | 0 1 0 1 | TC2 | TC2 |
| 5 | 1 1 1 1 | TC1 | TC1 |
| 6 | 1 1 0 1 | TC1 | TC2 |

COMMUNICATION SYSTEM UTILIZING DYNAMICALLY SLOTTED INFORMATION

BACKGROUND OF THE INVENTION

The present invention relates generally to digital communication systems, and more particularly to a hybrid switching and transmission system in which a designated portion of digital information is assignable to a permanent slot and to more than one additional temporary slots as necessary for efficient use of system resources for integrated traffic.

Hybrid switching systems of the prior art use a specialized framing technique to integrate conventional voice and data traffic, in recognition that the hybrid integration principle is based on a sharing of the same transmission carrier to incorporate both circuit (voice) and packet (data) traffic. A multi-bit envelope (or frame) is constructed which is transmitted through the carrier, with variations achieved by varying frame construction. Toward that end, the prior art has moved toward variations of the slotted envelope network (SENET) concept discussed by Coviello et al. in their presentation on "Integration of circuit/packet switching by a SENET concept" at the National Telecommunications Conference in New Orleans in 1975. The variants proposed thus far are characterized by either a fixed or a variable envelope length. According to the SENET concept, frames are divided into slots for voice and data. Slot sizes are variable to handle various bit rate traffic, and slots between circuit-switched channels are separated by a boundary.

A variety of SENET versions have been proposed in the past; for example, by Weinstein et al., "Data traffic performance of an integrated circuit- and packet-switched multiplex structure," IEEE Transactions on Communications, Com-28, No. 6, 873-878, June 1980; by Bially et al., "Voice communications in integrated digital voice and data networks," IEEE Transactions on Communications, Com-28, No. 9, 1478-1490, September 1980; by Fisher et al., "A model for evaluating the performance of an integrated circuit- and packet-switched multiplex structure," IEEE Transactions on Communications, Com-24, No. 2, 195-202, February 1976; and by Gerla et al., "Bandwidth allocation and routing in ISDN's," IEEE Communications Magazine, 22, 2, 16-26, February 1984. These proposals include fixed boundaries, movable boundaries, and fixed/movable boundaries with silent activity detection (SAD).

The version with dynamically movable boundaries and SAD implementation offers good bandwidth utilization, but suffers certain disadvantages. Among the latter are additional overhead and additional processing delays resulting from the need to inspect "busy bit" in each slot, as discussed, for example, in the aforementioned Gerla et al. publication. The dual nature of the SENET's frame simplifies the interfaces with existing separate circuit and packet networks.

Alternatives to the dual frame are a fixed-length packet frame or a non-fixed burst frame. Fixed-length packet frames are the foundation of fast packet switching, as described by Turner, "Design of an integrated services packet network," Proceedings of the Ninth Datacomm Symposium, ACM SIGCOMM Computer Communications Review 15, No. 4 124-133, September 1985. As a universal carrier, fixed-length packets provide for transmission of a variety of multimedia traffic components.

On the other hand, non-fixed burst frames are the foundation of burst switching technology, which is based on the concept that bandwidth should be allocated to the voice/data call only during the talk spurt or data message. In essence, burst switching technology recongizes that gaps exist between signals, and that in the case of a voice signal, an active period of voice transmission is followed by a gap or silence. As soon as the switching system detects the gap, it immediately places the bandwidth in a common pool for availability to other users. From that standpoint, burst switching technology is a statistical multiplexing system.

Figure 1:
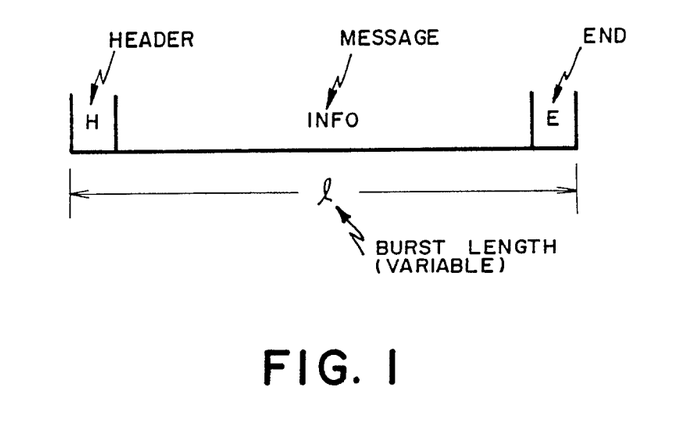
FIG. 1, described above, is a graphical representation of a typical non-fixed burst indicating the three common elements thereof, constituting prior art.

A non-fixed burst frame is a variable digital bit stream consisting of three elements, namely, (1) a header containing routing and control information, (2) the contents of the burst consisting of message information, which may be digitized voice, user data, or control data, and (3) an "end-of-burst" code. The configuration of the non-fixed burst frame is shown in FIG. 1. The duration of the active voice period will vary, and, hence, the burst length is variable. The variable length of the burst is a significant feature of burst switching technology. The same situation occurs with data transmissions as that with voice transmissions. The data packet or block is put into a slot, and as soon as the sender completes its transmission, that portion of the bandwidth is given to another user.

Because of burst switching technology, different sources of message information (voice or data) can be combined on the same transmission medium frame, T1. By way of example, and with reference to FIG. 2, assume that T1 has twenty-four channels, and that source #i is active. Upon recognition that source #i is active, the T1 frame is looked at and it is found that channel #n is free. Source #i is the assigned to that channel and retains it for the duration of the burst. Consequently, each T1 frame the information is sent byte by byte from source #i to the receiver until, after the last byte has been transmitted, channel #n becomes free.

Figure 2:
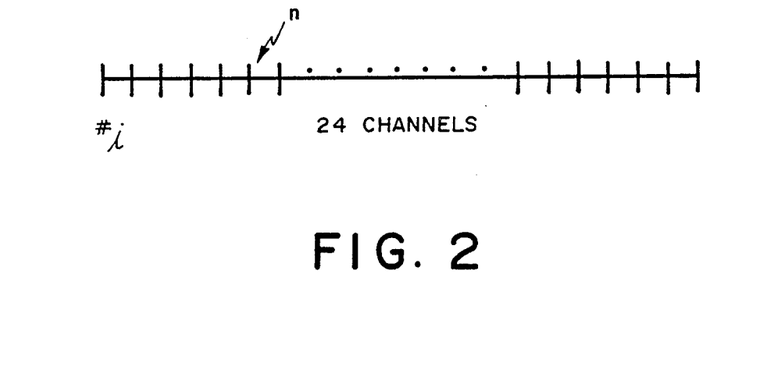
FIG. 2, also described above, is a graphical representation of a typical transmission medium or frame in which any one of a multiplicity of slots is used for each burst, depending on which of them are free with further slot assignments according to subsequent availability, as found in prior art burst switching systems.

Although other levels of burst switching technology involve switching architecture and network structure, the principle constituting the foundation of that technology is relatively simple: that is, recognize the burst transmission, assign a channel, and retain the channel until the burst is ended. For the sake of simplicity of the present discussion, only point-to-point transmission is considered. Channels are not permanently assigned to particular sources. The next source that becomes active during a period of transmission by source #i on channel #n will simply occupy whatever other channel is available. All statistical multiplexers operate on this basis.

Dual SENET, fixed-length packet, and non-fixed burst frames have been developed as a foundation for integrated switching systems. They reflect a different, and sometimes contradictory set of objectives which, historically, have been established for integrated transmission of conventional voice, interactive data, and control information.

Statistical multiplexing with limited resource management has heretofore been the most popular approach for the packet side of the hybrid switching/transmission. The designated portion of the digital information, block or burst, which is assigned to the proper slot cannot be reassiagned to an additional slot until the end of the block or burst.

SUMMARY OF THE INVENTION

The present invention departs from conventional burst switching technology by more efficiently and intelligently distributing information among the available slots in a multi-media frame having a specified bandwidth. Rather than allowing a slot representing one portion of the bandwidth to be occupied from start to finish of a transmission by a particular source, as is the case with conventional burst switching technology, according to the present invention the various slots are occupied for only so long as the decision making process dictates. The sender makes a decision regarding bandwidth allocation on a frame-by-frame basis, thereby enabling sources to be moved from one slot to another or to several slots at the time of mid-transmission. The receiver monitor the various slots at all times to keep track of what information (data, voice, image, and so forth) is arriving from specific sources.

In one presently preferred embodiment, a map is transmitted by the sender to indicate which sources are occupying which slots. Map related control data is transmitted in the control slot. The receiver is not concerned with the types of information received—only with the slot(s) occupied by the information. Two alternative mapping schemes may be implemented; namely, sequential or parallel.

In another, alternative preferred embodiment, coupling code given by the sender to the burst/block of data is transmitted in all assigned slots of the same frame. Several coupling codes may be carried by the same frame.

Unlike the burst switching technology of the prior art, the designated portion of the digital information, block or burst, is assigned to a particular slot but can be reassigned to an additional slot or slots on a frame-by-frame basis, as the circumstances may require. In other words, the present invention allows an intelligent reallocation of bandwidth for each frame, and it does so by implementation of a dynamic bandwidth allocation in the bandwidth control handler, using an external bandwidth control concept.

Accordingly, it is a principal object of the present invention to provide a hybrid switching and transmission system for the communication of different multimedia traffic components, including voice, data, image and so forth, in a circuit or packet switched network, with guaranteed performance levels for all components of heterogeneous traffic.

Another major object of the invention is to correlate traffic and available bandwidth in a communications system to achieve maximum bandwidth utilization.

To achieve these and other important objects which will become apparent from the ensuing description, the present invention provides an entirely controllable bandwidth in which blocks or bursts are assigned priority rights to particular slots, and depending on the need for transmission, are temporarily assigned to additional slots on a frame-by-frame basis as a result of the intelligent decision made by external bandwidth control.

BRIEF DESCRIPTION OF THE DRAWINGS

The above and still further objects, features and attendant advantages of the present invention will become apparent to those skilled in the art to which the invention pertains from a consideration of the following detailed description of certain presently preferred and alternative embodiments thereof, when taken in conjunction with the accompanying drawings in which.

DETAILED DESCRIPTION OF THE PREFERRED EMBODIMENTS

The present invention may be referred to as a dynamically slotted information (DSI) technique, in that the slot assignments are dynamically varied, frame-by-frame, according to the transmission needs of any given source. Yet, the priority rights of another source to particular slots are recognized and satisfied should that other source request a transmission. The DSI technique involves two important considerations, one being external bandwidth control and the other being dynamic bandwidth allocation.

The invention uses a structure which may be referred to as a multimedia frame having n slots. Each slot has a different size (bandwidth), which is driven by the slot-assigned source of the data. Thus, for example, a 64 kbs source of information should have a 64 kbs slot. Assume, for the sake of illustration, that source #i is active and has slot #3 assigned to it, so that source #i is transmitting data on slot #3. If source #i has a neighbor, source #k, which is transmitting on two slots, one of which is assigned to #i, and #i needs an additional slot (more bandwidth), #i will push #k out of #i's assigned slot.

If a store-and-squirt traffic handling policy is being implemented, such as when the buffer is filled to capacity with information and it is desired to transmit the information as soon as possible, the system of the present invention allows a free slot to be occupied temporarily until the source which is the host for that slot requires it, at which time the transmission is moved to the legitimately assigned slot for the source of the information being transmitted. The interest is in the proper distribution of a burst among the available slots in the multimedia frame. If wideband data is to be transmitted to occupy a one megabyte slot, and nothing else is to be transmitted at that time, the one megabyte slot will be occupied. If, however, another source requires a portion of the frame, the bandwidth required by the transmitting source(s) will be shrunk sufficiently to allow the new source to transmit. The key is that the entire bandwidth will always be used.

The out-of-frame external bandwidth control consideration of the DSI technique is implemented in recognition that for effective coexistence of different traffic components in the transmission media, there is a need to meet performance requirements for each individual traffic component and to minimize the impact of potential trade-offs while simultaneously increasing bandwidth utilization. External bandwidth control is achieved by means of algorithms providing the functions of bandwidth assignment rules, bandwidth access control, and bandwidth allocation control. By way of further explanation, external bandwidth control presents an implementation concept that separates transmission and control of the bandwidth.

The bandwidth assignment rules define procedures to assign each slot in the master frame to the multimedia traffic components. These rules are necessary to establish a framework for the bandwidth control. The system designer should specify assignment rules for each one of the slots before programming is commenced. The first rule states that assignment conditions should be specified for each slot, which is unlike any statistical multiplexing scheme. This creates a structure for total bandwidth control. Three types of assignment conditions are applied: (1) common assignment, (2) single assignment, and (3) multiple assignment. Common assignment declares the availability of each slot for any traffic components, as when transmitting information that requires a speed higher than the available capacity of the bandwidth slot. For store-and-squirt traffic handling policy implementation, the burst will seize available bandwidth. Single assignment declares the availability of each slot for only one traffic component (i.e., voice, data, facsimile, or other). Multiple assignment declares the availability of each slot for several different multimedia traffic components. It should be observed that common assignment does not impose any restrictions on use of a slot by any kind of data blocks, whereas multiple assignment does. That is, multiple assignment assumes that the slot can be used only by several types of the data blocks (i.e., traffic components), but not by all.

The second rule states that the size of the slot should be defined by each component of the multimedia traffic. This means, for example, that the size of each slot should be proportional to the assigned traffic data rate. For multiple assignment, the slot should provide maximum bit rate traffic component with proportional size of the bandwidth.

The third rule states that each dedicated slot should have only one assignment. That is to say, such a slot can never be seized by other data, under any circumstances. The assignment for a dedicated slot can be changed only by an authorized party.

Figure 3:
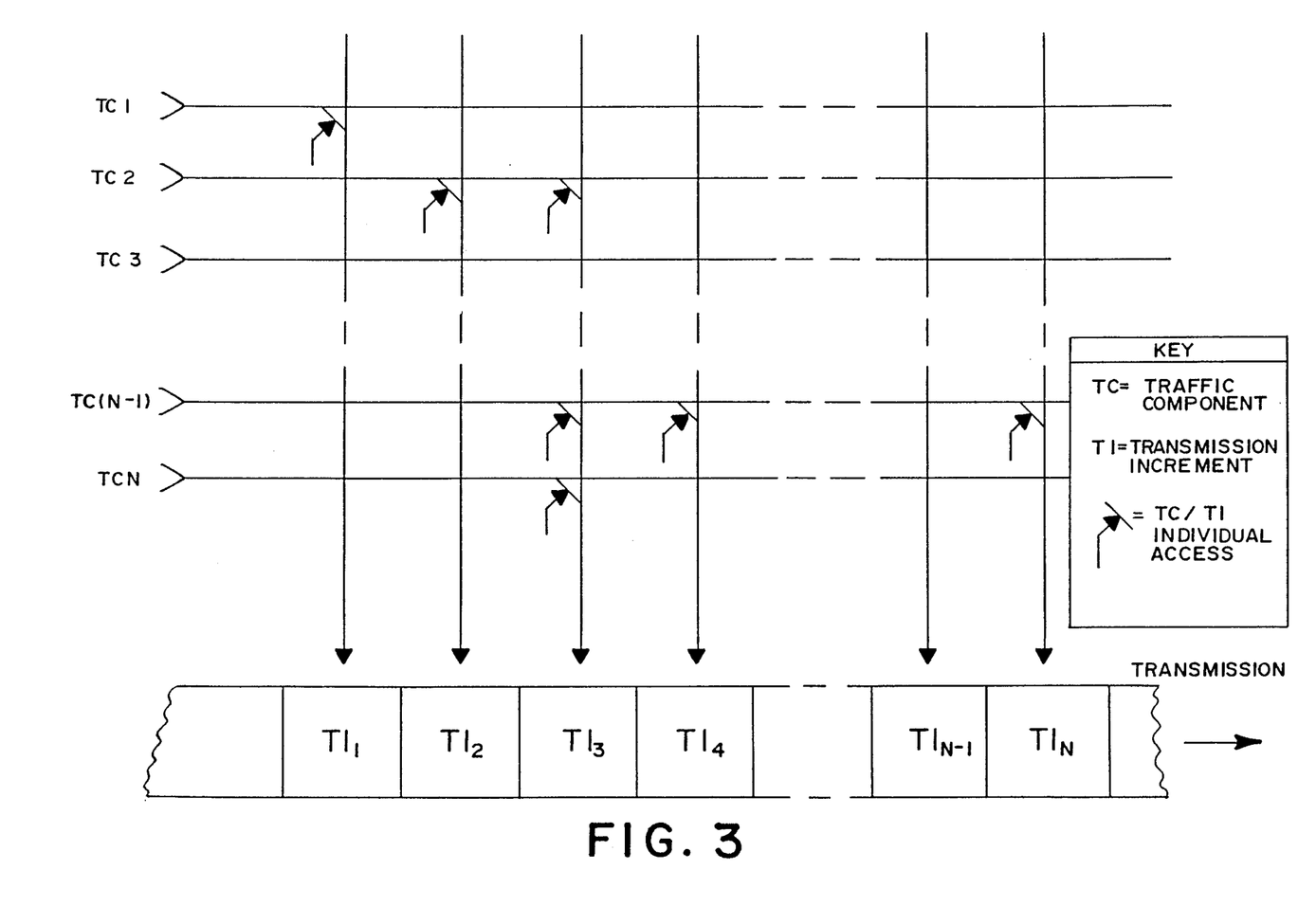
FIG. 3 is a representation useful in explaining the bandwidth access control structure according to the present invention.

The algorithm for bandwidth access control is based on the predefined and customized access structure, in which access structure describes the availability of a transmission slot for each component of the integrated traffic, as in the system of FIG. 3. In that Figure, TC1, TC2, TC3, . . . , TC(N−1), TCN are traffic components; TI1, TI2, TI3, . . . , TI(N−1), TIN are transmission increments or slots, and the arrow at an angle to various ones of the points of intersection represents TC/TI for individual access. A slot represents the smallest specified portion of the bandwidth, and may be defined as a designated bandwidth carrying specified homogeneous traffic. A system having a transmission slot size equal to one bit is referred to as a system with unchannelized bandwidth.

The decision to permit or deny access to a particular portion of the bandwidth to a particular traffic component is to be accomplished on the system design level. For example, access to a dedicated slot may be denied to all components of the traffic other than that component to which the slot is dedicated, or, alternatively, a secured portion of the bandwidth may be denied to other componets of the traffic. The bandwidth access control algorithm determines the actions taken by the external bandwidth control to permit or deny such access to each accessible portion of the bandwidth. These actions may include verification of conditional or nonconditional accessibility of the required portion of the bandwidth.

Accessibility is determined by a precedence function which reflects all feasible dynamic interactions over a given time among the different traffic components in anticipation of service, and which represents the distribution of priorities between traffic components assigned to each slot. Implementation of trade-off strategy and traffic handling policies result in periodic modification of the precedence function. In the case of common assignment, the simple precedence function for the individual component #i accessing slot #j may be expressed by the Boolean formula:

$$\phi_{ij} = C_i \wedge \overline{\bigwedge_{1}^{i-1} C_n}$$

where C=1 in the event of active request by the traffic component #i. The precedence function for component #i accessing all slots can be expressed by $$F_i = \bigwedge_{1}^{S} \phi_{ij}$$

where i=1, 2, 3, . . . , k; k is the number of traffic components; and S is the number of slots.

The bandwidth allocation control function of the external bandwidth control is an algorithm which generates a conditional access formula representing a precedence function to be updated according to a well-defined trade-off strategy and traffic handling policies. Actual allocation of slots is provided as a result of the logical interaction between the current status of the slots and the conditional access formula.

Figure 4:
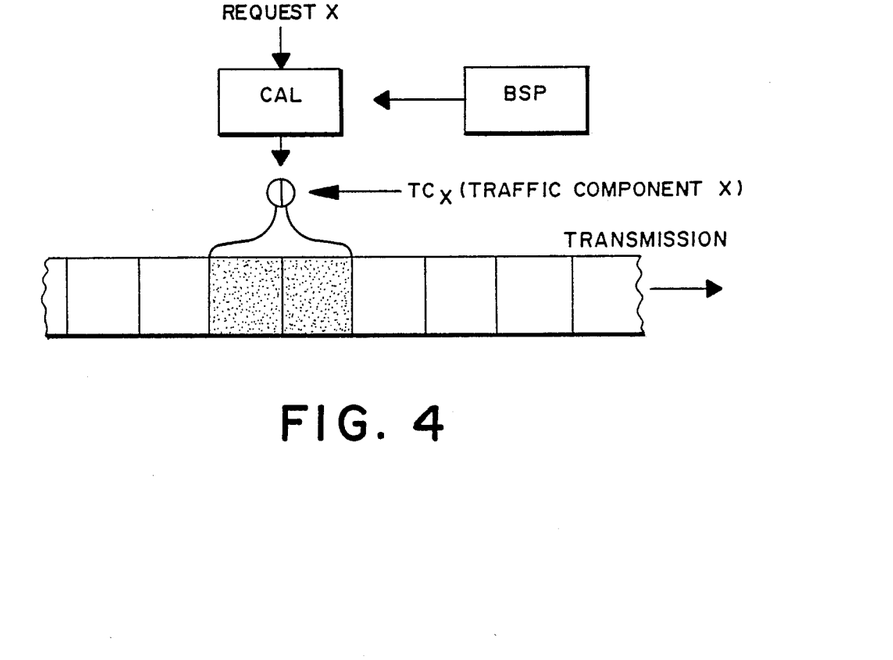
FIG. 4 is a representation of the bandwidth allocation control structure of the system of the invention.

As noted above, bandwidth utilization is a key factor in improving the performance of all multimedia traffic components. Another significant part of the bandwidth allocation control structure is a bandwidth status pointer which contains information about the current status of the slots. The decision regarding allocation of a particular portion of the bandwidth is based on logical interaction between the conditional access formula and the bandwidth status pointer, and, after the decision is made, the bandwidth allocation control algorithm allocates this portion of the bandwidth to the requester as shown in FIG. 4.

As a further differentiation between bandwidth access control and bandwidth allocation control, it should be observed that the former is represented by a primary precedence function which must be structured as part of the system design. On request, the bandwidth allocation control uses that primary precedence function as a reference, updates that reference according to the recent trade-off strategy, and retains it until the next request. In other words, the bandwidth allocation control compares a currently updated precedence function with the present status of the slots and provides the actual allocation of the slots. At the time of the next request, the bandwidth allocation control repeats this process, starting again with the primary precedence function (i.e., the bandwidth access control).

Figure 5:
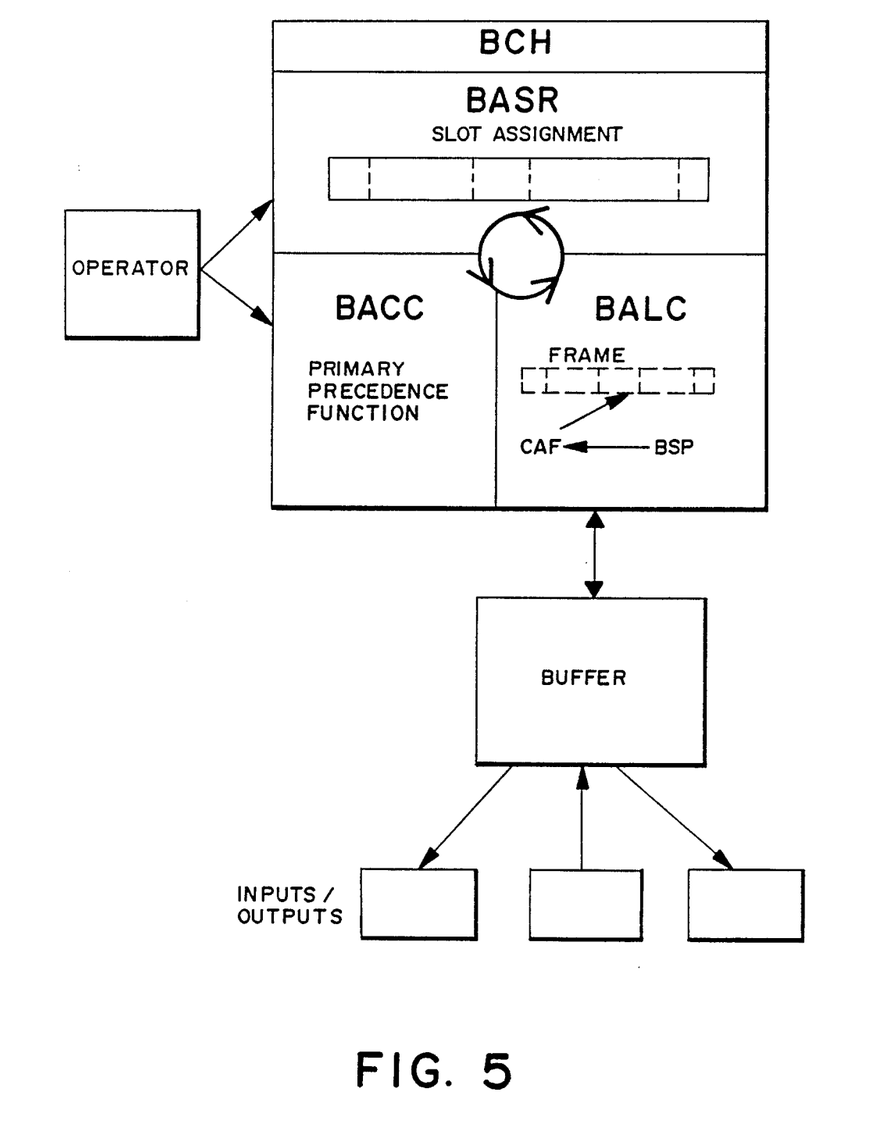
FIG. 5 shows the bandwidth control handler functions in an embodiment of the invention.

A bandwidth control handler (BCH) is a central intelligence unit that controls the frame status, access to the bandwidth, bandwidth allocation and bandwidth assignments, by implementing the bandwidth assignment rule functions (BASR), the bandwidth access control functions (BACC), and the bandwidth allocation control functions (BALC), as shown in FIG. 5.

The BASR functions unit takes information from authorized personnel and provides a breakdown of the bandwidth into slots. In addition, the BASR assigns conditions to each slot, viz., common, multiple, single, or dedicated assignment; and it may also provide automatic reconfiguration of the bandwidth from an alternative bandwidth configuration. The BASR then passes on the information to the BACC. The latter develops the primary precedence function, maintains all periodic modifications, and keeps track of the traffic handling policies. To that end, the BACC communicates with authorized personnel to gather information which is necessary to build the primary precedence function, and also communicates with the BALC and the BASR. The BALC develops the frame structure and allocates the slots inside the frame, which involves keeping track of the present bandwidth status through the bandwidth status pointers (BSPs). The BSPs contain information concerning the current status of the slots. The decision regarding allocation of a particular portion of the bandwidth is to be made as a result of the logical interaction between the conditional access formula (CAF) and the BSPs. After that decision is made, the BALC allocates this portion of the bandwidth to the requester. The BALC communicates with input/ouput subsystems through a common buffer and operates all critical real-time functions on a frame-by-frame basis; and interacts with the BACC during CAF generation.

By means of external bandwidth control, control functions are eliminated from the frame to reduce potential overhead. This differs from the prior art "busy bit" approach, in which information regarding the slot's assignment is in the frame. It should be noted that the external bandwidth control separates transmission and control of the bandwidth, and, in relaxing real-time control requirements, demands a high level of intelligence in the bandwidth control handler.

The other major aspect of the dynamically slotted information technique of the present invention, aside from the external bandwidth control with its three functions, is the dynamic allocation of bandwidth. According to this aspect of the invention, an algorithm is provided by which a designated portion of digital information, block or burst, is assigned to the proper slot and may be reassigned to an additional slot or slots on a frame-by-frame basis. All slots except the dedicated slot have multiple assignments, which creates the opportunity to distribute a slotted block of information among the currently available slots. The introduced algorithm describes assignment and allocation of the increments in the transmission frame. In that respect, dynamic bandwidth allocation is a dynamic nature of the allocation process which depends on the preliminary specified system requirements.

The achievement of bandwidth assignment and allocation by the dynamic allocation of bandwidth algorithm will be better understood from the following example. Each slot of a hypothetical two-slotted structure has a double assignment, consisting of traffic component #1 (TC1) and traffic component #2 (TC2). TC1 has preemption (priority) over TC2 for slot #1 and TC2 has preemption over TC1 for slot #2. Each slot is assumed in this example to be of the same size, i.e., to accomodate the same bandwidth. For the sake of this example, it is also assumed that only three sources generate traffic, two of which generate TC1 traffic and the third of which generates TC2 traffic. It is further assumed that only one of four requests may be made during the frame time, namely, TC1 start, TC1 finish, TC2 start, TC2 finish.

Figure 6:
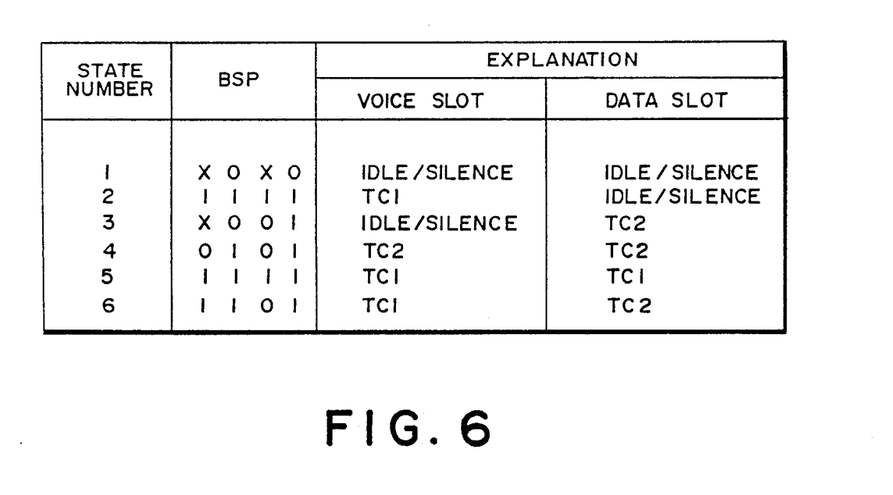
FIG. 6 is a table showing the states of an exemplary two-slotted multimedia transmission frame.

As shown in the table of FIG. 6, the two-slotted frame has six meaningful states. The conditional access formula generated by the bandwidth allocation control function of the external bandwidth control algoritihms will consider twenty-four logical situations, and six of those situations are considered as errors. The functional flow chart of the two-slotted frame shown in FIG. 7 describes the logical interactions between start/finish requests for data blocks TC1 and TC2 and bandwidth allocation control, between the conditional access formula and the bandwidth status pointer. This example assumes that TC1 has preemption over TC2 for slot #1, and TC2 has preemption over TC1 for slot #2. In the flow chart, the symbols C1S, C1F, C2S, and C2F mean TC1 start, TC1 finish, TC2 start, and TC2 finish, respectively, and the state numbers correspond to the BSP states in the table of FIG. 6. The flow chart also specifies the decision made in several different situations, three in this example. The decisions shown here are (i) queue data block until beginning of next frame, (ii) queue data block until bandwidth becomes available, and (iii) error handling.

Figure 7:
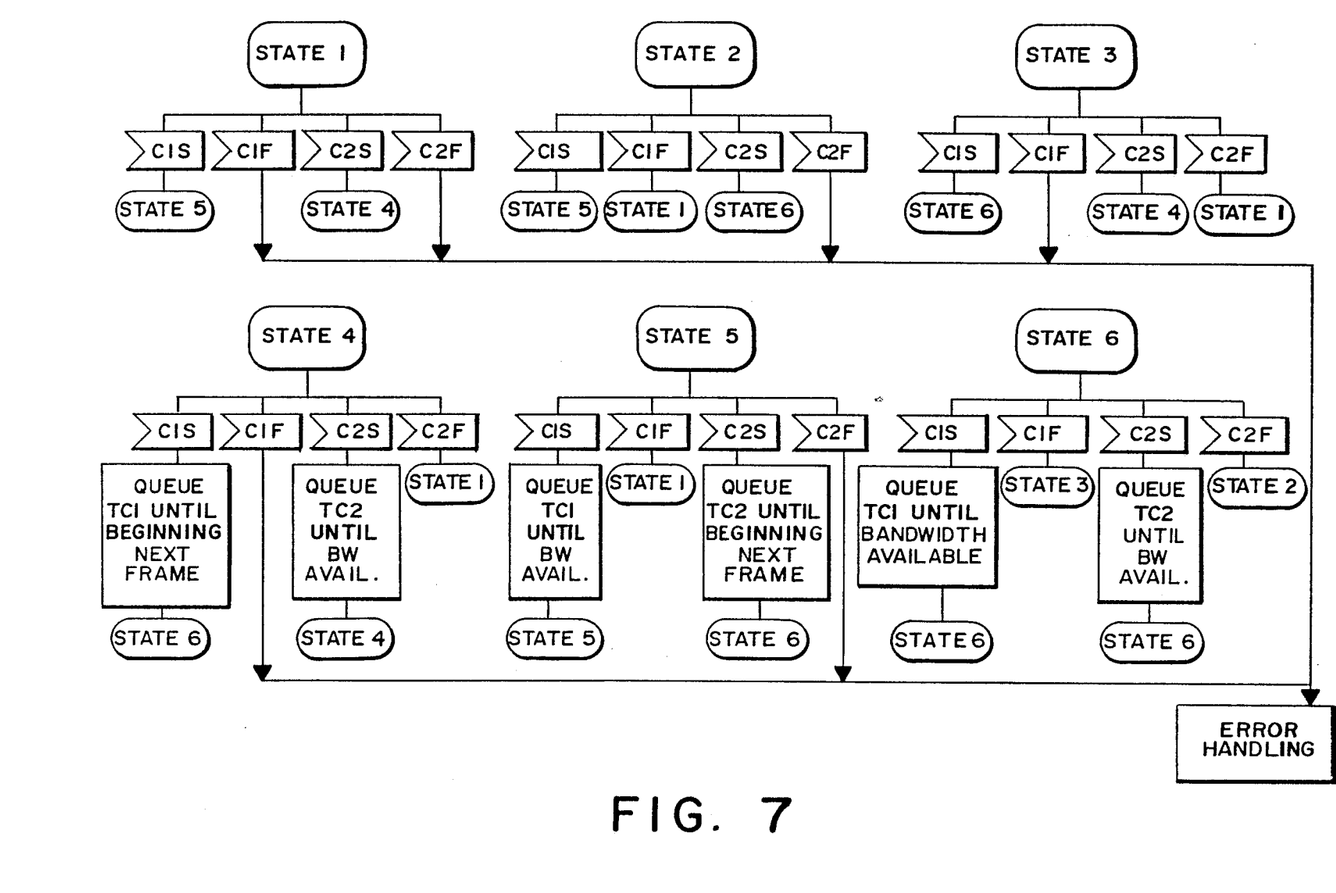
FIG. 7 is a functional flow chart of the two-slotted frame of FIG. 6.

Each event shown in the flow chart of FIG. 7, except error handling, always results in the bandwidth status pointer either changing to a different state or remaining in the same state. Each slot has a two-bit bandwidth status pointer describing status of the respective slot at any time, the first bit being a "source" bit which describes the type of data in the slot, and the second bit being a "state" bit which describes the availability or unavailability of the slot. For example, status may be indicated by the two bits as follows:

| Source | State |
| --- | --- |
| 0 = TC2 | 0 = idle (or silence) |
| 1 = TC1 | 1 = occupied |

Figure 8:
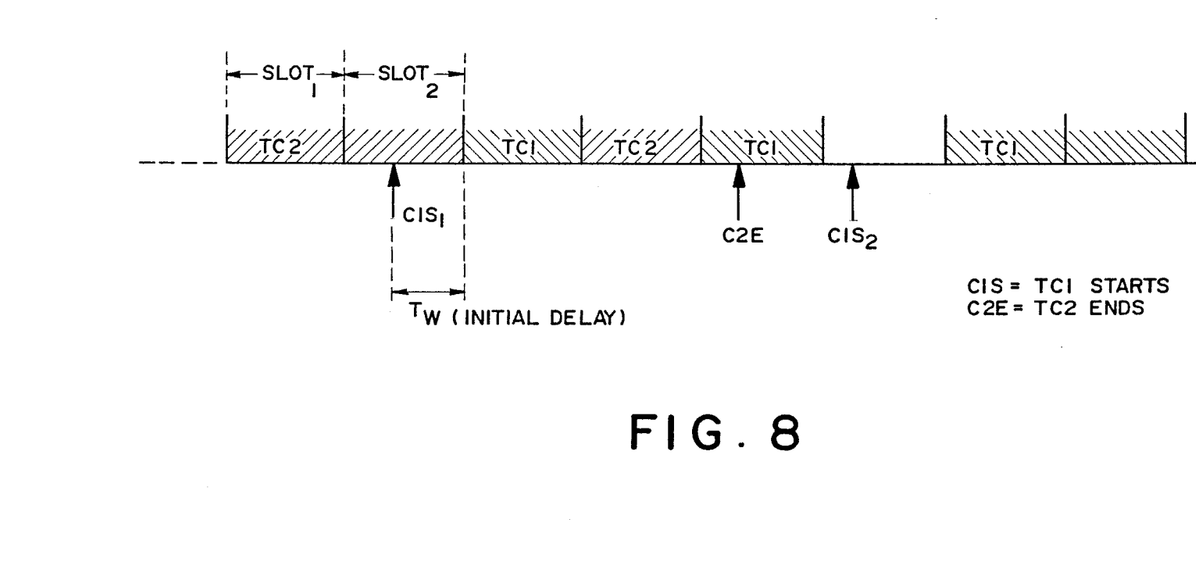
FIG. 8 is a representation of the dynamic allocation in the two-slotted structure.

Several advantages of the dynamic allocation of bandwidth are revealed in FIG. 8. Guaranteed bandwidth policy creates a mechanism to improve bandwidth utilization and performance parameters for each individual traffic component, and this mechanism commences the moment the traffic component starts. In the example of FIG. 8, at the moment TC1 starts (indicated by the symbol C1S[1]), both slot #1 and slot #2 are occupied by TC2. Because TC1 preempts TC2 for slot #1, however, slot #1 must be returned at the start of TC1 to its rightful "owner." TC2, which temporarily occupied slot #1, will continue to occupy slot #2 in the next frame. Inasmuch as slot #2 has a size proportional to the TC2 source data rate, a reduction in the transmission rate will occur in the allowed limit.

This scheme introduces an initial delay, which is always less than the duration of the frame. In cases of a short frame, the initial frame delay is insignificant, particularly in the presence of long packets and bursty traffic.

Following the TC1 start request, a C2F request indicative of the finish of traffic component TC2 means that slot #2 will become available in the next frame. If the second source now generates a second TC1 start request (C1S$_2$), TC1 will temporarily occupy slot #2 which was empty at the moment, untill the TC2 source generates a new request. When the latter occurs, TC2 will displace TC1 from slot #2 as its rightful "owner," at the beginning of the next frame.

In the case of common assignment, the number of different bandwidth status pointers can be expressed as follows:

$$N = (K+1)^s$$

In the case of single assignment, the number of different bandwidth status pointers is:

$$N = \left(\frac{k+1}{S}\right) + 1$$

The number of precedence levels varies from K for the simplest prioritizing scheme to 2 for the most complex scheme. It should be noted that the conditional access formula/bandwidth status pointer interactions can require significant real-time software if the system is required to implement a complex prioritizing scheme and analyze all possible dynamic interactions in the multi-slotted frame for each incoming request.

According to the principles of the present invention, the system must provide the receiver with real-time information concerning dynamic reassignments of the slots on the sender's side. In a first presently preferred embodiment, the sender updates an assignment map on the receiver's side by sending control information in the preassigned control slot. In another, alternative preferred embodiment, if several slots are occupied by a single block of data, a special coupling code is transmitted to indicate the slots occupied by that block. Both of these presently preferred embodiments are based upon the same three fundamentals, as follows:

(1) All intelligent decisions concerning bandwidth allocation are made by the sender. The receiver provides integrity of the dynamically coupled slots without preliminary knowledge of the nature of the data.

(2) The sender updates the assignment map of the receiver only at the time of reallocation of the slots immediately before the start of data transmission.

(3) The sender does not update the assignment map of the receiver at the end of the data block.

According to a first preferred embodiment, two further basic principles are also followed. First, control data related to the slot/source assignments is transmitted in the control slot. The control slot may have single or multiple assignments. Second, two alternative mapping schemes may be implemented, viz., sequential or parallel mapping.

Figure 9A:
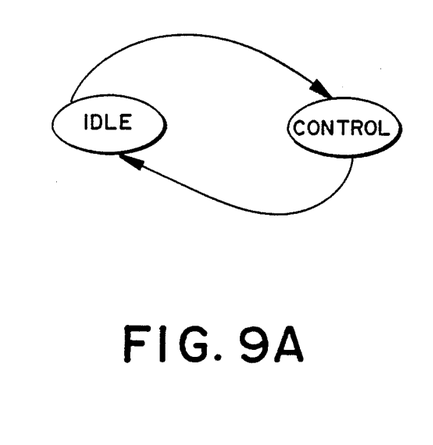
FIGS. 9A, 9B, 10A, 10B, and 11 are charts and tables useful for explaining a first preferred embodiment of the invention.
Figure 9B:
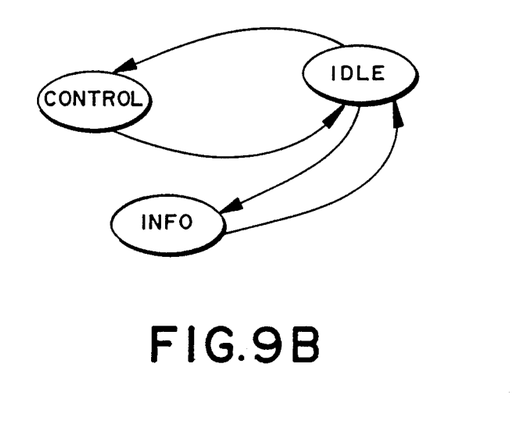

As soon as the bandwidth control handler described earlier herein updates its assignment map, the sender transmits control data to the receiver to match that update. As shown in FIG. 9A, if the control slot which carries that information has a single assignment, the receiver is called upon to perform the simple task of recognizing one of the two states, that is, idle or control. In some instances, the control slot may have multiple assignments, as shown in FIG. 9B, and in those instances the receiver will define the status of the slot by analyzing the control/information bit in the control word. The control word begins with a "start control" and ends with an "end control", with the control/info bit and slot assignment sandwiched between them.

Figure 10A:
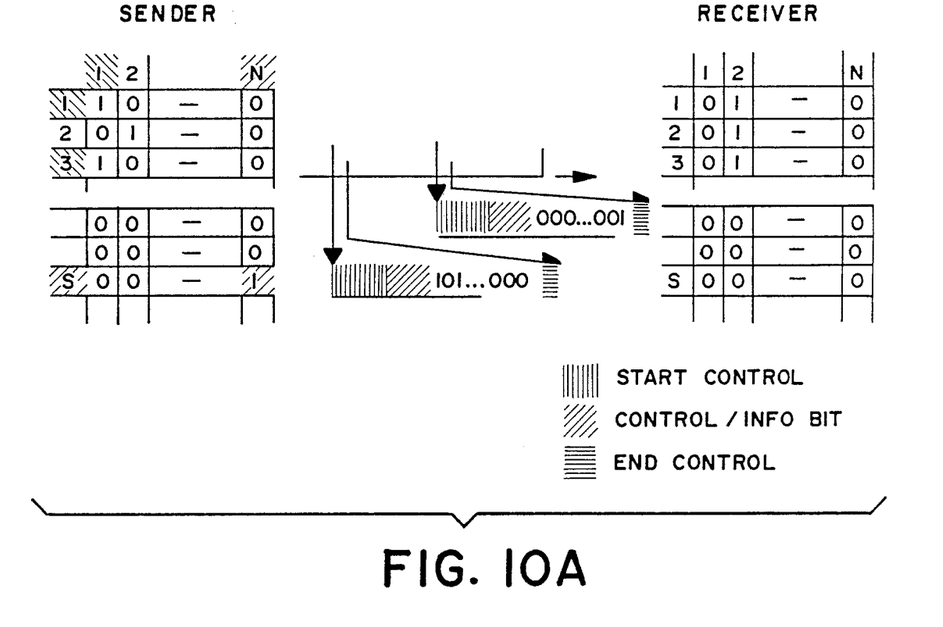
Figure 10B:
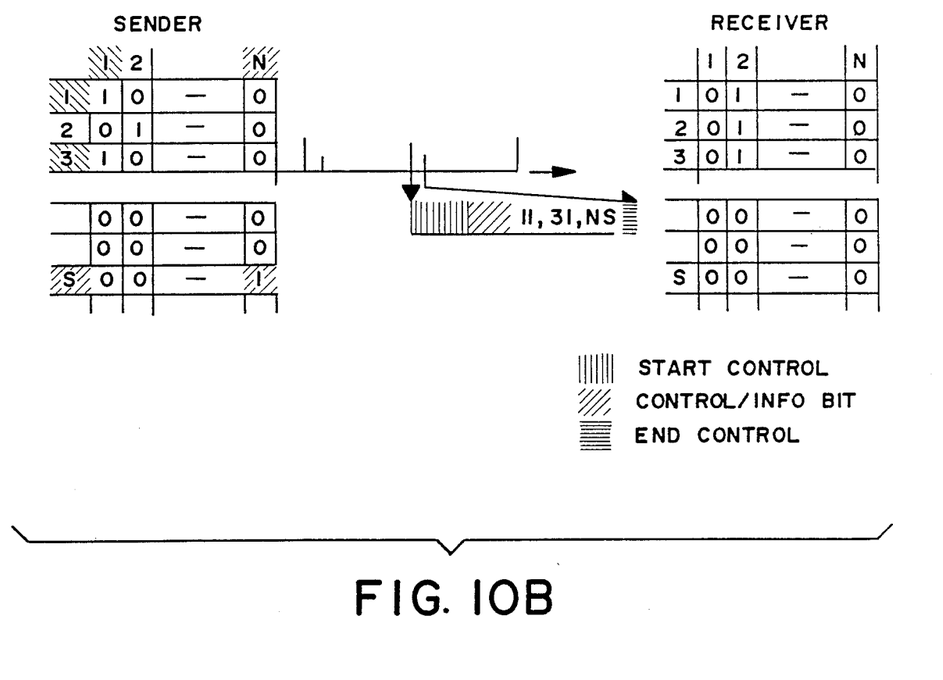

Referring for example to FIG. 10A, one of the two options for transmitting control information is sequential mapping, which requires the transmission of only one assignment per frame. In that Figure, two frames are transmitted sequentially, the first carrying the assignment for source #N (000 ... 001) and the second transporting the assignment for source #1 (101 ... 000). The other option, parallel mapping is illustrated in FIG. 10B. Parallel mapping offers a faster update at the receiver's side, but as shown in the latter Figure, it requires more extensive coding and decoding. Here, two or more assignments may be carried by a single frame, and, in this instance, the assignments for sources #1 and #N are the same as those used in the example of FIG. 10A.

Figure 11:
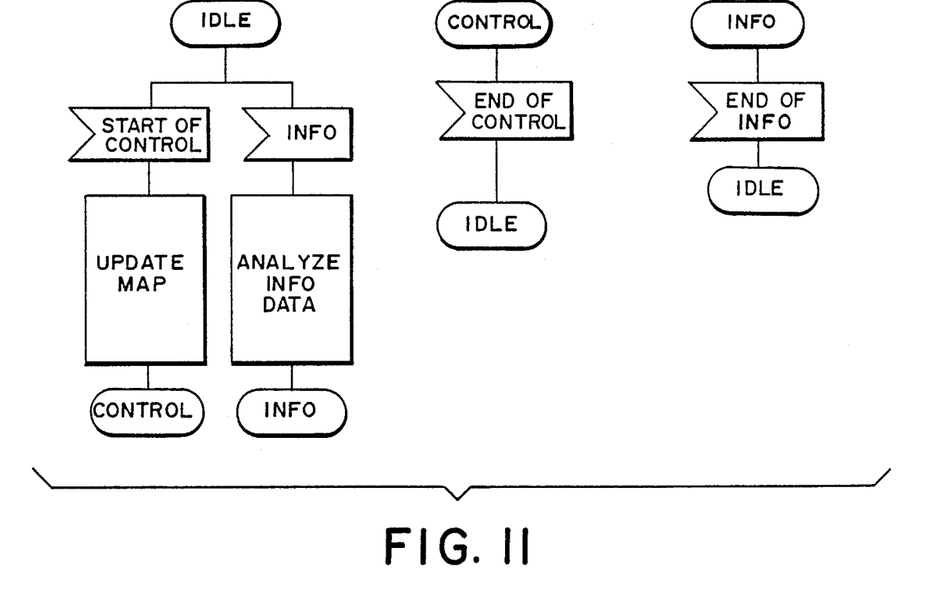

The functional flow chart of FIG. 11 illustrates an implementation of multiple assignment and mapping at the receiver's side. For an idle slot, a control word initiates the start of control and the map is updated. The control/info bit of the control word is analyzed, an assignment is indicated, and the transmitted information is received. At the end of the control word, the idle slot is available for the transmission of information from another source.

Figure 13:
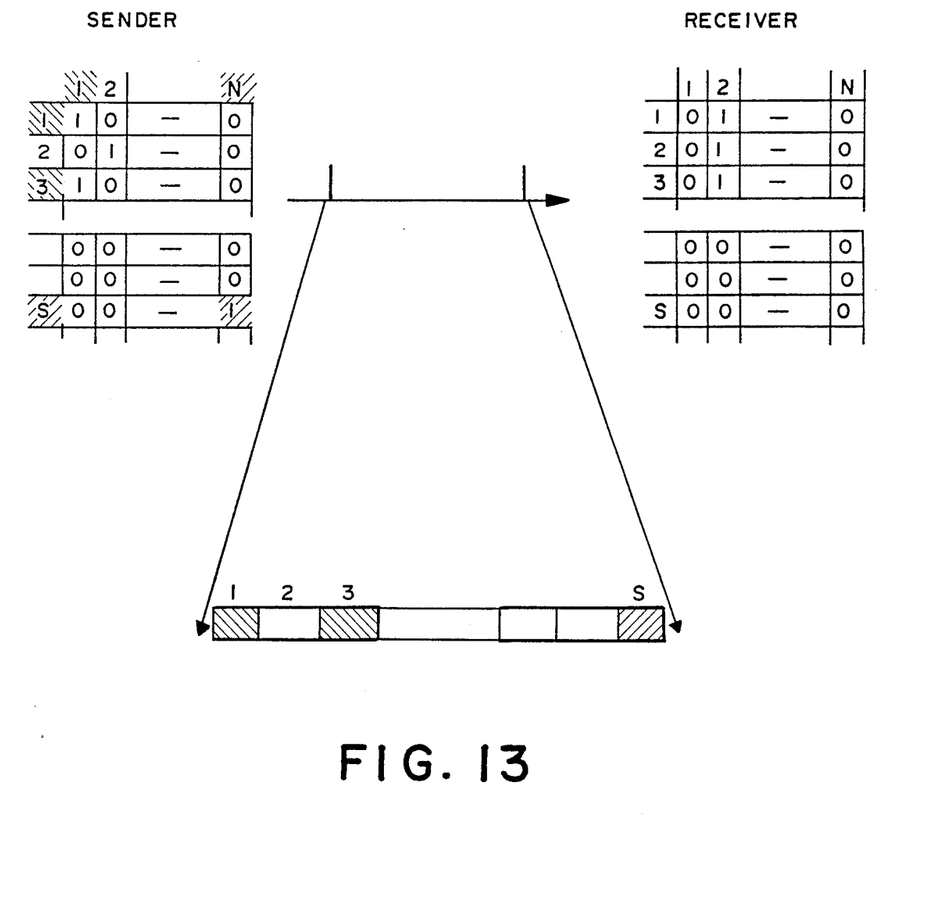

In an alternative preferred embodiment, two basic principles are applied, in addition to the aforementioned three fundamentals. First, a coupling code given by the sender to a block of data is transmitted in all assigned slots of the same frame. Second, several coupling codes may be carried by the same frame. In this embodiment, the bandwidth control handler updates its assignment map and the sender transmits appropriate coupling codes to the receiver to match the update. Referring to FIG. 13, which uses the same example of source assignments as was shown in FIGS. 10A and 10B, two coupling codes for two data blocks are transmitted to the receiver. Slots #1 and #3 contain the coupling code for the data block from source #1, and slot #S has the coupling code for the data block from source #N.

Figure 12A:
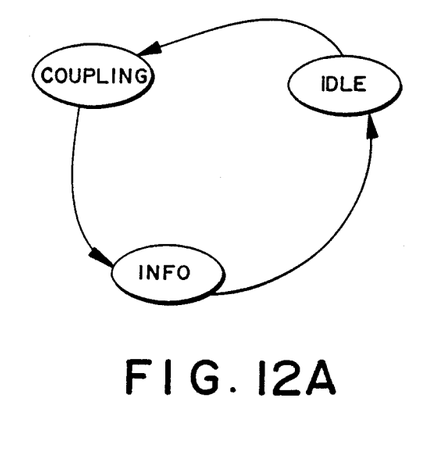
FIGS. 12A, 12B, 13, and 14 are charts and tables useful for explaining an alternative preferred embodiment of the invention.
Figure 12B:
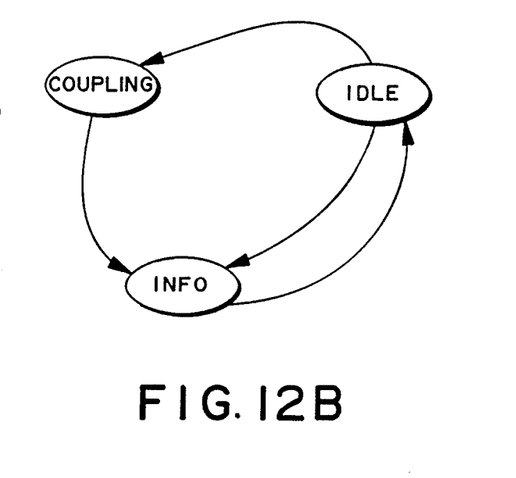

According to this embodiment, two alternative techniques may be employed to differentiate coupling codes from actual data. As indicated in FIG. 12A, a first technique is to have the coupling code always precede the data, and, in that case, the data transmission will always follow a coupling code. The second technique requires separation of the coupling codes from the data by use of unique patterns, as shown in FIG. 12B. A preceding coupling serves to simplify coding but necessitates an initial one frame delay for each data block.

Figure 14:
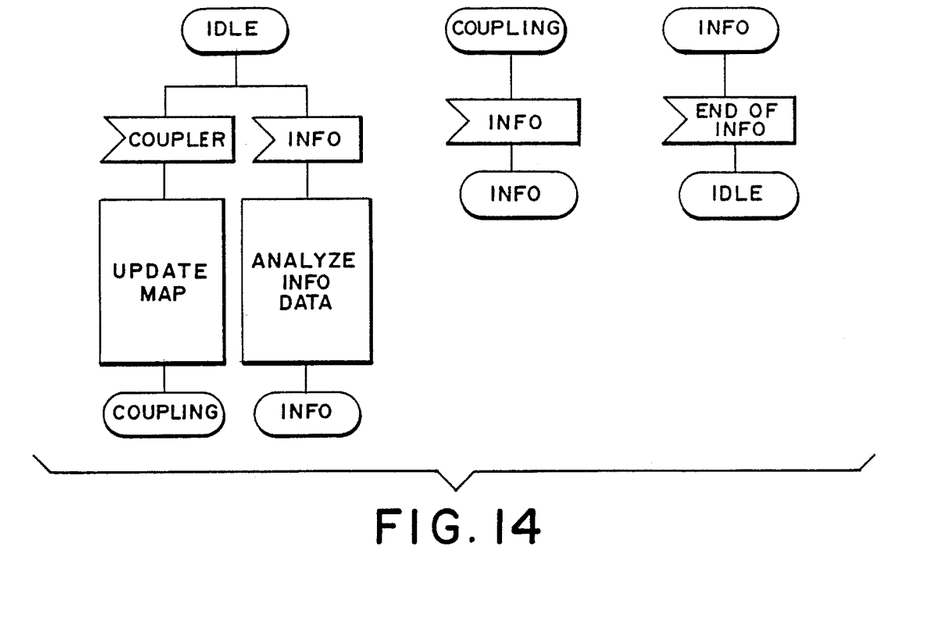

The functional flow chart of FIG. 14 illustrates an implementation of coupling on the receiver's side. The flow is the same as that described above for the mapping embodiment of FIG. 11, except that the coupling is employed in this embodiment.

Although certain presently preferred embodiments of the invention have been described, it will be apparent to those of ordinary skill in the art to which the invention pertains that variations and modifications of the disclosed embodiments may be made without departing from the true spirit and scope of the principles of the invention. Accordingly, it is intended that the invention shall be limited only as and to the extent required by the appended claims and the applicable rules of law.

I claim:

1. Burst switching apparatus for a hybrid switching and transmission system adapted to carry traffic components of digital information including voice and data in multimedia slotted frames, comprising means for assigning said traffic components of the digital information in the form of bursts from preselected sources thereof to respective slots in each frame to guarantee transmission of the information generated by each active source within a predetermined bandwidth, and means for reallocating the bandwidth to provide additional slots within each frame, from among those slots allocated to then-inactive sources, to the active sources on a frame-by-frame basis as necessary to accommodate the respective bandwidths required for the information generated by the active sources from among the total available bandwidth of the system.

2. The invention of claim 1, wherein said reallocating means includes means for providing the additional slots by a combination of external control of bandwidth and dynamic allocation of bandwidth.

3. The invention of claim 2, wherein said assigning means includes means for providing an entirely controllable bandwidth in which the bursts are assigned priority rights to particular slots, and said reallocating means temporarily assigns to any active source additional slots from among those slots to which other sources have priority, on a frame-by-frame basis for only so long as the sources having priority to the temporarily assigned slots are inactive.

4. The invention of claim 3, wherein said reallocating means is responsive to a request for transmission from a previously inactive source to provide that source with bandwidth transmission capacity of at least the slot to which it has priority right designated by said assigning means, at the commencement of the next frame.

5. The invention of claim 2, wherein said reallocating means includes means for external bandwidth control, said external bandwidth control means including means for implementing bandwidth assignment rules, means for implementing bandwidth access control, and means for implementing bandwidth allocation control.

6. The invention of claim 5, wherein said means for implementing bandwidth assignment rules defines procedures to assign each slot in a master frame to a respective predetermined multimedia traffic component, including a first rule providing that assignment conditions are to be specified for each slot, a second rule providing that the size of the slot is to be defined by the respective component of the multimedia traffic, and a third rule providing that each dedicated slot is to have only one assignment.

7. The invention of claim 6, wherein said bandwidth assignment rules implementing means includes first rule means for establishing three types of assignment conditions consisting of common assignment, single assignment, and multiple assignment, said common assignment constituting provision of the availability of each slot for any of the traffic components, whereby to accommodate the transmission of information requiring a speed higher than the available capacity of the respective slot; said single assignment constituting provision of the availability of each slot for only one traffic component; and said multiple assignment constituting provision of the availability of each slot for a plurality of different ones of the traffic components.

8. The invention of claim 7, wherein said bandwidth assignment rules implementing means further includes second rule means for establishing the size of each slot to be proportional to the assigned traffic data rate.

9. The invention of claim 5, wherein said bandwidth access control implementing means establishes accessibility of a slot for each traffic component.

10. The invention of claim 5, wherein said bandwidth access control implementing means includes means for establishing a precedence function which reflects all feasible dynamic interactions over a given time among the different traffic components in anticipation of service, and which represents the distribution of priorities between traffic components assigned to each slot.

11. The invention of claim 10, wherein said bandwith access control implementing means further includes means for periodic modification of the precedence function in response to desired changes in traffic handling procedures.

12. The invention of claim 5, wherein said bandwidth allocation control means includes means for generating a conditional access formula constituting another precedence function which is updated according to desired traffic handling procedures, and in which the actual allocation of slots is determined by the logical interaction between the current status of the slots and the conditional access formula.

13. The invention of claim 12, wherein said bandwidth allocation control means further includes means for establishing a bandwidth status pointer containing information regarding the current status of the slots.

14. The invention of claim 13, wherein said bandwidth allocation control means further includes means for deciding on the allocation of a particular portion of the bandwidth based on the logical interaction between the conditional access formula and the bandwidth status pointer, and means responsive to the decision for allocating said particular portion of the bandwidth to a requesting source.

15. The invention of claim 2, wherein said reallocating means includes means for dynamic allocation of bandwidth, including means for assigning a designated portion of the information to a particualr slot and for reassigning such designated portion of information to at least one additional slot on a frame-by-frame basis.

16. The invention of claim 5, wherein
said reallocating means further includes means for dynamic allocation of bandwidth, including means for assigning a designated portion of the information to a particular slot and for reassigning such designated portion of information to at least one additional slot on a frame-by-frame basis.

17. A digital transmission system for efficiently and intelligently distributing digital information from sources thereof among all of the slots in a multimedia frame having a specified bandwidth, comprising
means for allowing a slot representing one portion of the bandwidth to be occupied from start to finish of a transmission by a particular source,
processing means for making decisions on the need for transmission among the sources and the availability of all then-currently inactive slots among all of the slots for each said multimedia frame, and
means responsive to the decision making process for selectively controlling said allowing means to vary the occupancy of the slots by the different sources in mid-transmission, for data transmissions in accordance with said decision making process.

18. The invention according to claim 17, further including sender means and receiver means at opposite ends of said system, said sender means including said processing means for making a decision regarding bandwidth allocation on a frame-by-frame basis to enable said sources to be moved from one slot to another.

19. The invention according to claim 18, wherein said receiver means monitors the slots at all times to keep track of the information arriving from specific sources.

20. The invention according to claim 19, wherein said sender means transmits mapping data within the data transmissions to said receiver means for indicating which sources are occupying slots at any given time.

21. The invention according to claim 20, wherein said sender means includes means for transmitting said mapping data sequentially.

22. The invention according to claim 20, wherein said sender means includes means for transmitting said mapping data in parallel.

23. The invention according to claim 20, wherein said receiver means includes means nonresponsive to the type of information received for detecting the slots occupied by the information.

24. The invention according to claim 19, wherein said sender means tramsits coupling code data to said receiver means within blocks of data in all assigned slots of the same frame, for indicating which of the slots are carrying related information at any given time.

25. The invention according to claim 19, wherein said controlling means assigns and reassigns the designated portion of digital information within each transmission among the plurality of slots on a frame-by-frame basis, in response to the decision making process.

26. The invention according to claim 25, wherein said controlling means includes means for implementing a dynamic bandwidth allocation of said slots.

27. Apparatus for providing an entirely controllable bandwidth for data transmissions between sources of information and destinations thereof in which blocks or bursts containing the information are assigned priority rights to particular slots in successive multimedia frames, comprising means for determining the need for transmission among the various sources, means for controlling the bandwidth of the various slots, and means responsive to the determined need and to the control of bandwidth of the slots for temporarily assigning transmissions among all of the slots in each frame according to bandwidth thereof on a frame-by-frame basis.

28. Burst switching apparatus for a hybrid switching and transmission system adapted to carry traffic components of digital information in successive multimedia slotted frames, comprising
means for assigning portions of the digital information in blocks from preselected plural sources thereof to respective selected slots in each frame to assure uninterrupted transmissions of information generated by each active source among said plural sources, within a predetermined bandwidth, and
means for reallocating the bandwidth to provide temporarily available slots from among said selected slots within each frame to the active sources on a frame-by-frame basis as necessary to accommodate the respective bandwidths required for the information generated by the active sources from among the total available bandwidth of the system.

29. The apparatus of claim 28, wherein
said assigning means includes means for establishing an entirely controllable bandwidth in which said blocks are assigned priority rights to particular slots, and
said reallocating means includes means for temporarily assigning to any active source one or more of the slots from among those to which other sources are assigned priority, on a frame-by-frame basis for periods of time during which such other sources having priority remain inactive.

30. The invention of claim 29, wherein
said reallocating means includes means for external bandwidth control, said external bandwidth control means including
means for implementing bandwidth assignment rules to define procedures to assign each slot in a master frame to a respective predetermined multimedia traffic component, including a first rule providing that assignment conditions are to be specified for each slot, a second rule providing that the size of the slot is to be defined by the respective component of the multimedia traffic, and a third rule providing that each dedicated slot is to have only one assignment;
means for implementing bandwidth access control to establish a precedence function of all feasible dynamic interactions over a given time among the different traffic components in anticipation of service, representing the distribution of priorities between traffic components assigned to each slot; and
means for implementing bandwidth allocation control to generate a conditional access formula constituting another precedence function which is updated according to desired traffic handling procedures, to determine the actual allocation of slots by the logical interaction between the current status of the slots and the conditional access formula.

31. The invention of claim 30, wherein
said bandwidth assignment rules implementing means includes
first rule means for establishing three types of assignment conditions consisting of common assignment, single assignment, and multiple assignment; said common assignment constituting provision of the availability of each slot for any of the traffic components, whereby to accommodate the transmission of information requiring a speed higher than the available capacity of the dedicated slot; said single assignment constituting provision of the availability of each slot for only one traffic component; and said multiple assignment constituting provision of the availability of each slot for a plurality of different ones of the traffic components; and second rule means for establishing the size of each slot to be proportional to the assigned traffic data rate.

32. The invention of claim 31, wherein
said bandwidth access control implementing means includes
means for establishing accessibility of a slot for each traffic component; and
means for periodic modification of the precedence function in response to desired changes in traffic handling procedures.

33. The invention of claim 32, wherein
said bandwidth allocation control implementing means includes
means for establishing a bandwidth status pointer containing information regarding the current status of the slots,
means for deciding on the allocation of a particular portion of the bandwidth based on the logical interaction between the conditional access formula and the bandwidth status pointer, and
means responsive to the decision for allocating said particular portion of the bandwidth to a requesting source.

34. The invention of claim 33, wherein
said reallocating means further includes means for dynamic allocation of bandwidth, including means for assigning a designated portion of the information to a particular slot and for reassigning such designated portion of information to at least one additional slot on a frame-by-frame basis.

* * * * *